(12) United States Patent
Wijntjes et al.

(10) Patent No.: US 12,449,020 B2
(45) Date of Patent: Oct. 21, 2025

(54) ADJUSTMENT MECHANISM AND ADJUSTMENT DEVICE COMPRISING SUCH ADJUSTMENT MECHANISM

(71) Applicant: MCi (Mirror Controls International) Netherlands B.V., Woerden (NL)

(72) Inventors: Jannick Daniël Wijntjes, Rotterdam (NL); François Roderik Henri Bouaziz, Rotterdam (NL); Peter Alexander Hamming, Ermelo (NL); Léo Brière, Maarssen (NL); Yi Song, Woerden (NL); Tom Adriaan Jansen, Utrecht (NL); Justin Fransen, Zaandam (NL); Meindert Jan Solkesz, Rotterdam (NL); Marinus Jacobus Maria Van Zuijlen, Woerden (NL); Stefan Fritz Brouwer, Schoonhoven (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 0 days.

(21) Appl. No.: 18/838,170

(22) PCT Filed: Feb. 13, 2023

(86) PCT No.: PCT/NL2023/050064
§ 371 (c)(1),
(2) Date: Aug. 13, 2024

(87) PCT Pub. No.: WO2023/153931
PCT Pub. Date: Aug. 17, 2023

(65) Prior Publication Data
US 2025/0146555 A1 May 8, 2025

(30) Foreign Application Priority Data
Feb. 14, 2022 (NL) .................................. 2030921

(51) Int. Cl.
*F16H 1/20* (2006.01)
*F16H 1/22* (2006.01)
(Continued)

(52) U.S. Cl.
CPC ............. *F16H 1/225* (2013.01); *F16H 55/24* (2013.01); *F16H 57/03* (2013.01); *F16H 57/039* (2013.01);
(Continued)

(58) Field of Classification Search
CPC .......... F16H 1/225; F16H 55/24; F16H 57/03; F16H 57/039; F16H 2057/0213; F16H 2057/0325
See application file for complete search history.

(56) References Cited

U.S. PATENT DOCUMENTS 6,742,409 B2 * 6/2004 Blanchard ............. F16H 57/021
74/416
7,806,018 B2 * 10/2010 Greulich ............... F16H 57/039
74/425
(Continued)

FOREIGN PATENT DOCUMENTS

CN 203230825 U * 10/2013 ............ F16C 29/005
CN 114623211 A * 6/2022 ............. F16H 3/093
(Continued)

*Primary Examiner* — Adam D Rogers
(74) *Attorney, Agent, or Firm* — Volpe Koenig

(57) ABSTRACT

An adjustment mechanism for an adjustment device comprising a main worm gear wheel having a hollow central passage and a main worm. The main worm gear wheel is held in an injection molded plastic housing having at least one opening axially aligned with the central passage to allow a shaft to extend via the opening into the central axial passage to be in supporting engagement with the main gear. The main worm is held in the housing for rotation about a main axis of the main worm, and includes at least one circumferential spiral tooth in intermeshing arrangement
(Continued)

with teeth on the circumference of the main worm gear wheel, and can be driven to rotation relative to the housing about its main worm axis. Stiffeners are provided between the housing and the main worm gear wheel and/or the main worm to lock the intermeshing arrangement of the teeth under torque.

20 Claims, 6 Drawing Sheets

(51) Int. Cl.
    *F16H 55/24*     (2006.01)
    *F16H 57/02*     (2012.01)
    *F16H 57/03*     (2012.01)
    *F16H 57/039*     (2012.01)
    *F16H 57/021*     (2012.01)
    *F16H 57/032*     (2012.01)

(52) U.S. Cl.
    CPC ............... *F16H 2057/0213* (2013.01); *F16H 2057/0325* (2013.01)

(56) References Cited

U.S. PATENT DOCUMENTS

| | | | |
|---|---|---|---|
| 10,533,653 B2* | 1/2020 | Nakamura | F16H 57/04 |
| 10,654,417 B2* | 5/2020 | Motomiya | B60R 1/074 |
| 10,780,798 B2* | 9/2020 | Falster | B60N 2/0284 |
| 10,865,869 B2* | 12/2020 | Paul | F16H 1/166 |
| 11,261,948 B2* | 3/2022 | Müller | F16H 25/20 |
| 12,209,680 B2* | 1/2025 | Wang | F16K 31/04 |
| 2010/0206111 A1 | 8/2010 | Keller et al. | |
| 2016/0369883 A1* | 12/2016 | Chang | F16H 1/16 |
| 2018/0112763 A1 | 4/2018 | Paul et al. | |
| 2025/0012351 A1* | 1/2025 | Lee | F16H 57/0025 |

FOREIGN PATENT DOCUMENTS

| | | | | |
|---|---|---|---|---|
| CN | 117967744 A | * | 5/2024 | |
| DE | 102014100934 A1 | * | 7/2015 | ........... F16H 57/039 |
| FR | 2998937 A1 | | 6/2014 | |
| GB | 733827 A | * | 7/1955 | |

\* cited by examiner

ADJUSTMENT MECHANISM AND ADJUSTMENT DEVICE COMPRISING SUCH ADJUSTMENT MECHANISM

CROSS REFERENCE TO RELATED APPLICATIONS

This application is a 35 USC § 371 national stage of International Application No. PCT/NL2023/050064, which was filed Feb. 13, 2023, and claims the benefit of NL Patent Application No. 2030921, filed Feb. 14, 2022, both of which are incorporated by reference herein as if fully set forth.

The invention generally relates to adjustment mechanisms, and in particular to adjustment mechanisms for adjustment devices for adjusting the position of an adjustable element.

Adjustment mechanisms for adjustment devices for adjusting the position of an adjustable element are generally known, and may for example be used to adjust a position of an adjustable element of a satellite receiver antenna, a solar panel, or another adjustable element. With the adjustment mechanism, the adjustable element may typically be adjusted with precision to a specific, desired position within a range of positions.

Such adjustment mechanisms are typically mass produced in automated assembly at low cost, and include a housing of injection molded plastics material. A disadvantage of known adjustment mechanisms is that they are less capable to maintain the desired position under external load.

It is an object of the present invention to provide an alternative adjustment device. In particular it is an object of the present invention to provide an adjustment mechanism for an adjustment device, in particular for adjusting the position of an adjustable element, that is more capable to maintain the desired position under external load. More in particular it is an object to do so without significantly increasing costs for manufacture, or even to do so while decreasing costs for manufacture.

Thereto, the present invention provides for an adjustment mechanism for an adjustment device, the adjustment mechanism comprising a main worm gear wheel held in an injection molded plastic housing for rotation relative to each other about a main axis of the worm gear wheel, the main worm gear wheel being provided with a hollow central axial passage and the housing provided with at least one opening that is axially aligned with the central axial passage to allow a shaft to extend via the opening through the housing into the central axial passage and to be in supporting engagement with the main worm gear wheel, the adjustment mechanism further comprising a main worm having at least one circumferential spiral tooth in intermeshing arrangement with teeth on the circumference of the main worm gear wheel, the main worm being held in the housing for rotation about a main axis of the main worm, and being arranged to be driven to rotation relative to the housing about its main worm axis via a drive train powered by an electric motor held in the housing, wherein a number of stiffeners is provided between the housing and the main worm gear wheel and/or the main worm to lock the intermeshing arrangement of the teeth under torque that is applied between main worm gear wheel and housing external to the drive train. By providing an adjustment mechanism with a number of stiffeners between the housing and the main worm gear wheel respectively the main worm that lock the intermeshing arrangement under external load, the adjustment mechanism can be made more capable to maintain a desired position within a range of positions under external load without significantly increasing costs for manufacture. As shall be explained further, the number of stiffeners may be one or more, and some stiffeners may have double or multiple stiffening functions.

Specifically, a number of stiffeners is provided between the housing and the main worm to limit axial, transverse and/or rotational movement of the main worm under torque that is applied between main worm gear wheel and housing external to the drive train, preferably wherein stiffeners are provided between the housing and the main worm to limit axial, transverse and rotational movement of the main worm under torque that is applied between main worm gear wheel and housing external to the drive train.

The stiffeners may include one or more plates provided in the housing that limit(s) movement of the main worm in opposite directions along its main axis. Such plate may be a pressure plate. The plate may e.g. be made of metal, and may e.g. be embodied as a set of end plates that abut opposing ends of an axle carrying the main worm. As an alternative a single plate may be provided on or to the housing that engages an axle carrying the main worm between baffles, or that engages such axle in a circumferential groove.

The stiffeners may include a slot provided in the housing that limits movement of the main worm in a direction transverse to its main axis. Such slot may e.g. be provided between fingers, e.g. of a fingered plate. Such plate may e.g. extend upward from a base of the housing or downward from a cover of the housing. Such slot may e.g. extend upward or downward in a direction parallel to the main axis of the main worm gear to limit downward respectively upward movement of an axle of the main worm. Such slot e.g. may include a snap fit bearing aperture to additionally limit movement opposite to an insertion direction after insertion of the axle. Additionally or alternatively, the stiffeners may include a slot provided in the housing that similarly limits movement of any element of the drive train, for example a gear of an intermediate gear set element, in a direction transverse to its main axis.

The stiffeners may include an intermediate gear set element held in the housing and included in the drivetrain between the electric motor that powers the drive train and the main worm gear wheel, the intermediate gear set element including a first gear on the motor side intermeshing with a second gear on the main worm side, the driving efficiency between the gears being less than 50% when the second gear drives the first gear so as to limit rotational movement of the main worm under torque that is applied between main worm gear wheel and housing external to the drive train.

The drive train may typically be arranged to reduce rpm and increase torque from the motor to the main worm. The electric motor may typically carry a motor worm on the motor axle. The motor worm may e.g. intermesh with teeth on a circumference of a worm wheel portion of a first gear. The first gear may e.g. further comprise evoloïd toothing, e.g having 2-6 teeth, preferably 3 or 4 teeth. The evoloïd toothing may e.g. cooperate with evoloïd toothing provided on a circumference of the second gear of the gear set. The second gear may e.g. be rotationally fixed on an axle of the main worm. The combination of the first gear and the second gear may preferably be self-breaking when the second gear is driven to drive the first gear, at least as part of the combination with the main worm gear wheel and/or the main worm.

As alluded to above, the housing may include a base and a cover. The cover may include a circumferential rim portion that is supported on a circumferential rim portion of the base, and the rim portions may extend substantially parallel to a bottom of the base.

The main worm gear wheel, the main worm and preferably the electric motor and further gear components of the adjustment mechanism may preferably be mounted to the base by insertion in an insertion direction that is transverse to a bottom plane of the base. The cover may be mounted to the base portion in the same direction after insertion of worm wheel, main worm, motor and further gear components or drive mechanism components. This simplifies automated assembly, and contributes to reducing manufacturing costs.

The stiffeners may comprise one or more, for example three, strut(s) to limit radial outward movement of the main axis of the main worm relative to the main axis of the main worm gear wheel.

One or more stiffeners of the number of stiffeners may be provided between the housing and the main worm gear wheel to limit axial and transverse movement of the main worm gear wheel relative to its main axis under torque that is applied between main worm gear wheel and housing external to the drive train.

The stiffeners may include a radial and/or axial bearing surface for the main worm gear wheel. Such bearing surface may e.g. extend around an opening in the housing, e.g. an opening in the base and/or cover. The bearing surface may e.g. be a slot in the housing, e.g. in the base or the cover, to retain a skirt of the main worm gear.

The stiffeners may include a local radial bearing support at an inner portion of a mantle surface of the main worm gear wheel at a location on the circumference of the main worm gear wheel where its teeth are in intermeshing arrangement with the circumferential spiral tooth of the main worm, so as to limit local radial inward movement of the mantle surface.

The stiffeners may include a strut that extends from one of the base and the cover, and that is held in the other of the base and the cover.

The stiffeners may include a bonded or other connection between the base and the cover. Such bonded or other connection may e.g. limit axial movement of the main worm wheel and/or limit movement of the main worm transverse to the main axis. Such bonded connection may be a glued connection. Preferably, such bonded connection is a welded connection. Such a welded connection may advantageously be an ultrasonic weld or a laser weld. Such welded connection may be made between the circumferential rim portions of the base and cover. The welded connection may form a continuous weld. The welded connection may also be or comprise a spot weld, e.g. a welded connection between a strut and the cover.

It shall be appreciated that the invention is not limited to a bonded connection between the base and the cover. For example, the base and the cover may alternatively or additionally be mutually connected by one or more fasteners such as screws, for example fastened at the circumferential rim portions, at one or more struts, and/or elsewhere. In that case, a connection formed by a fastener may form or be part of a stiffener.

The stiffeners may be arranged to limit relative rotation of the housing relative to the main gear wheel under a moment of 5 Nm applied between the housing and the main gear wheel when the drive is not in operation to less than 3°, preferably less than 2°, more preferably less than 1°, more preferably less than 0.5°. This allows the desired position to be secured even if an adjustment element is subjected to a significant external load. The stiffeners may thus provide a rotational stiffness between the housing and the main worm gear wheel of at least 1.6 Nm/°, 2.5 Nm/°, 5 Nm/° or 10 Nm/°.

The invention further relates to an adjustment device, comprising an adjustment mechanism as described herein, wherein the main worm gear wheel is in supporting engagement with a shaft of the adjustment device that extends via the opening through the housing into the central axial passage so as to be rotatable relative thereto. As an alternative, the shaft may e.g. be rotatably fixedly held on the shaft.

The main worm gear wheel may e.g. carry a hollow bevel gear arranged to rotate jointly therewith, which bevel gear intermeshes with a stationary bevel gear provided on the adjustment device, and the housing of the adjustment mechanism may e.g. be coupled to an element to be adjusted.

To suppress any rotational play between the main worm gear wheel and the hollow bevel gear, the main worm gear wheel and the hollow bevel gear may be mutually clamped, in particular via one or more wedging connections, e.g. formed between respective wedging structures provided along their circumference. In particular, the wedging connections may include cooperating wedges that are provided along the circumference of the axially facing surfaces of the main worm gear and the bevel gear that are clamped together axially under the load of a spring provided around the shaft.

The invention will further be elucidated on the basis of exemplary embodiments which are represented in the drawings. The exemplary embodiments are given by way of non-limitative illustration of the invention.

In the drawings.

It is noted that the figures are only schematic representations that are given by way of non-limiting examples. In the figures, the same or corresponding parts are designated with the same reference numerals.

Figure 8:
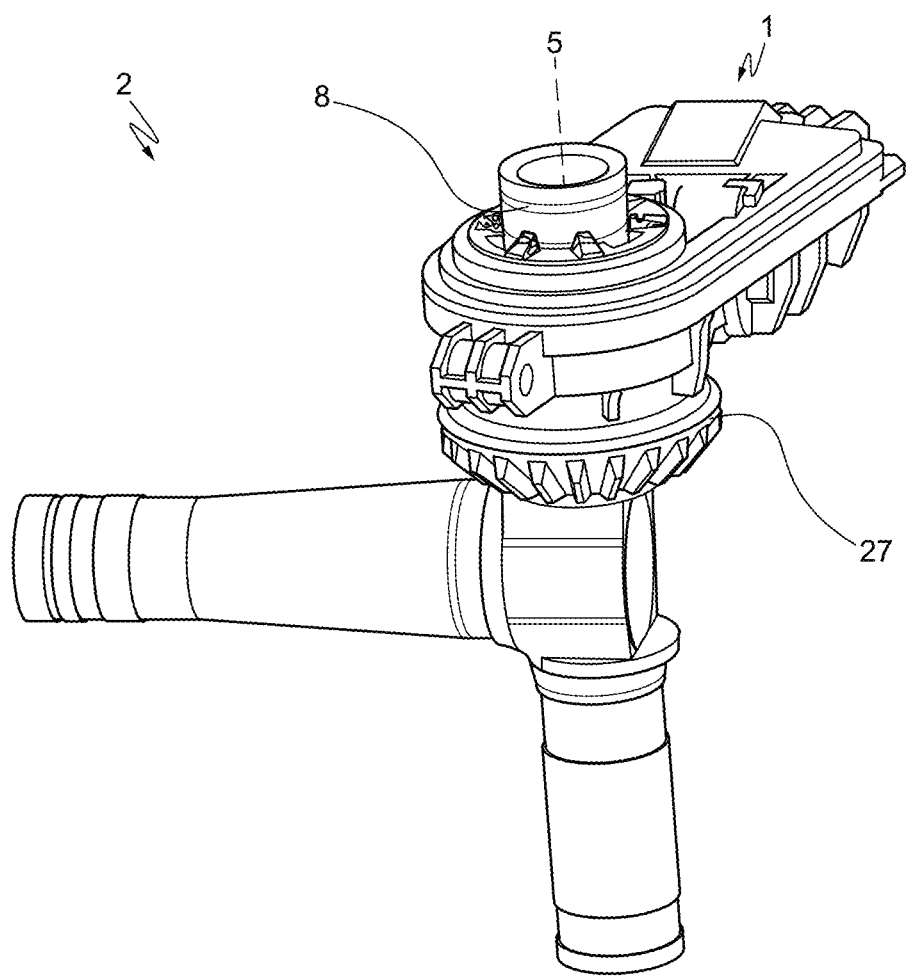
FIG. 8 shows a partly opened perspective view of an adjustment device.

The figures show examples an adjustment mechanism 1 for an adjustment device 2. FIG. 8 shows an adjustment device 2 comprising such an adjustment mechanism 1.

The adjustment mechanism 1 comprises a main worm gear wheel 3 held in an injection molded plastic housing 4 for rotation relative to each other about a main axis 5 of the worm gear wheel 3. The main worm gear wheel 3 is provided with a hollow central axial passage 6 and the housing 4 is provided with two openings 7 that are axially aligned with the central axial passage 6 to allow a shaft 8 (see FIG. 8) to extend via the opening 7 through the housing 4 into the central axial passage 6 and to be in supporting engagement with the main worm gear wheel 3.

The adjustment mechanism 1 further comprises a main worm 9 having at least one circumferential spiral tooth 10 in intermeshing arrangement with teeth 11 on the circumference of the main worm gear wheel 3. The main worm 9 is held in the housing 4 for rotation about a main axis 12 of the main worm 9, and is arranged to be driven to rotation relative to the housing 4 about its main worm axis 12 via a drive train 13 powered by an electric motor 14 held in the housing 4

A number of stiffeners S is provided between the housing 4 and the main worm gear wheel 3 and/or the main worm 9 to lock the intermeshing arrangement of the teeth 10,11 under torque that is applied between main worm gear wheel 3 and housing 4 external to the drive train 13.

In the shown examples, a number of stiffeners S is provided between the housing 4 and the main worm 9 to limit axial, transverse and rotational movement of the main worm 9 under torque that is applied between main worm gear wheel 3 and housing 4 external to the drive train 13.

In the exemplary adjustment device 2 shown in FIG. 8, the main worm gear wheel 3 is in supporting engagement with a shaft 8 of the adjustment device 2 that extends via the opening 7 through the housing 4 into the central axial passage 6 so as to be rotatable relative thereto.

With continued reference to FIG. 8, the main worm gear wheel 3 may carry a hollow bevel gear 27 arranged to rotate jointly therewith, which bevel gear 27 intermeshes with a stationary bevel gear (not shown) provided on the adjustment device 2. Such a stationary bevel gear may for example be fixed to a fixed support structure.

Figure 9:
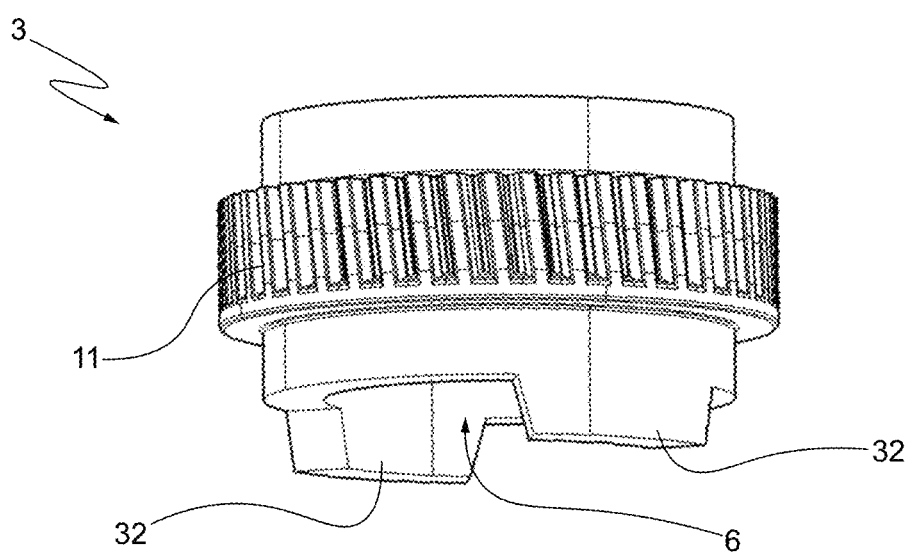
FIG. 9 shows a perspective view of a main worm gear wheel.

In some embodiments, the main worm gear wheel 3 and the hollow bevel gear 27 may are mutually clamped, in particular via one or more wedging connections formed between respective wedging structures 32 provided along their circumferences. Two such wedging structure 32 have been indicated in FIG. 9, where it can be seen that each wedging structure 32 here comprises a male wedging element having tapered side faces. In corresponding embodiments, the hollow bevel gear may have corresponding female wedging elements as respective wedging structures, where the mutual wedging structures or elements are dimensioned and/or shaped to become mutually clamped, in particular at the tapered side faces, when the main worm gear wheel 3 and the hollow bevel gear 27 are brought together axially. For example, a male wedging element may be somewhat oversized compared to a corresponding female wedging element. It shall be appreciated that, compared to the example shown in FIG. 9, fewer or more wedging elements can be applied, and that one or more male and/or female wedging elements can be provided at either side of the connection. In fact, with continued reference to FIG. 9, it can be considered that in this example two relatively large female wedging elements are present circumferentially in between the male wedging elements.

The housing 4 of the adjustment mechanism 1 may be coupled to an element to be adjusted (not shown), for example a satellite receiver antenna or a solar panel.

Figure 1:
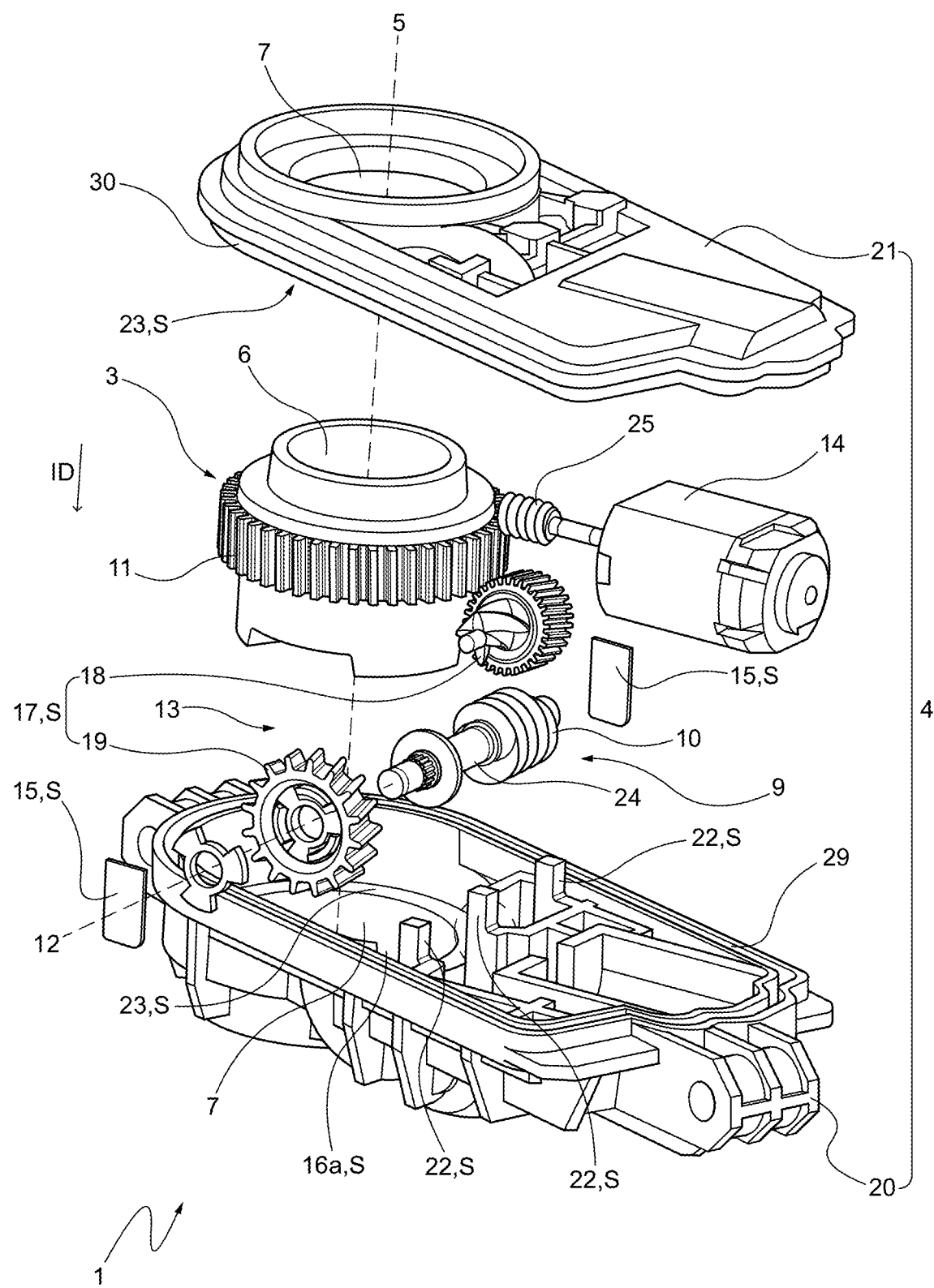
FIG. 1 shows a schematic exploded perspective view of an adjustment mechanism.
Figure 2:
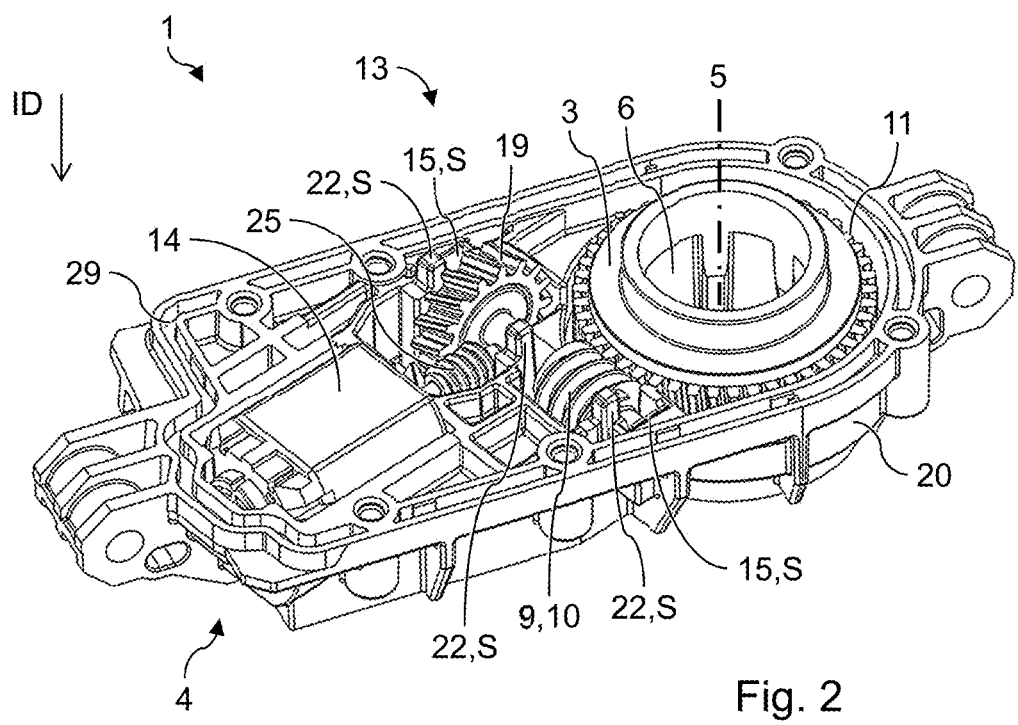
FIG. 2 shows a partly opened perspective view of an adjustment mechanism which is similar to the adjustment mechanism of FIG. 1.
Figure 5:
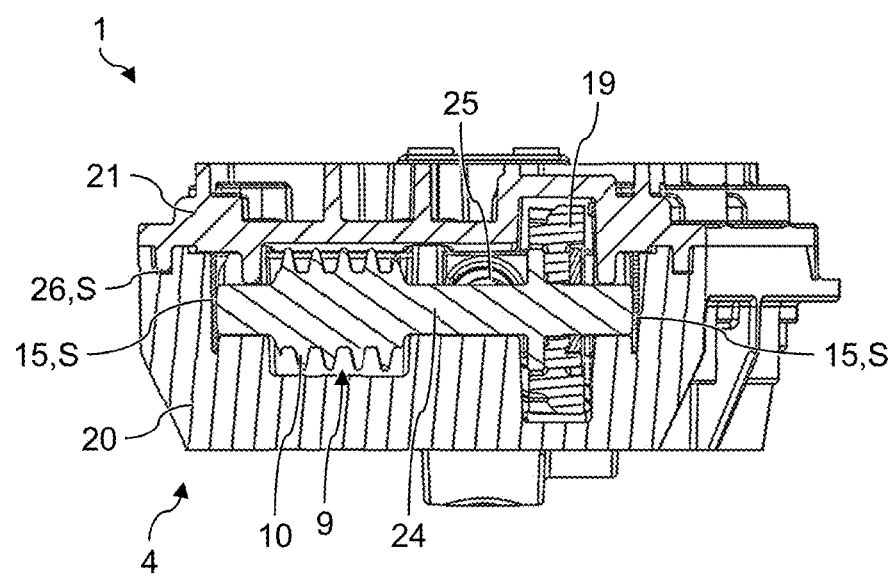
FIG. 5 shows a cross sectional view of the adjustment mechanism of FIGS. 2 to 4 along the line V-V in FIG. 3.
Figure 6:
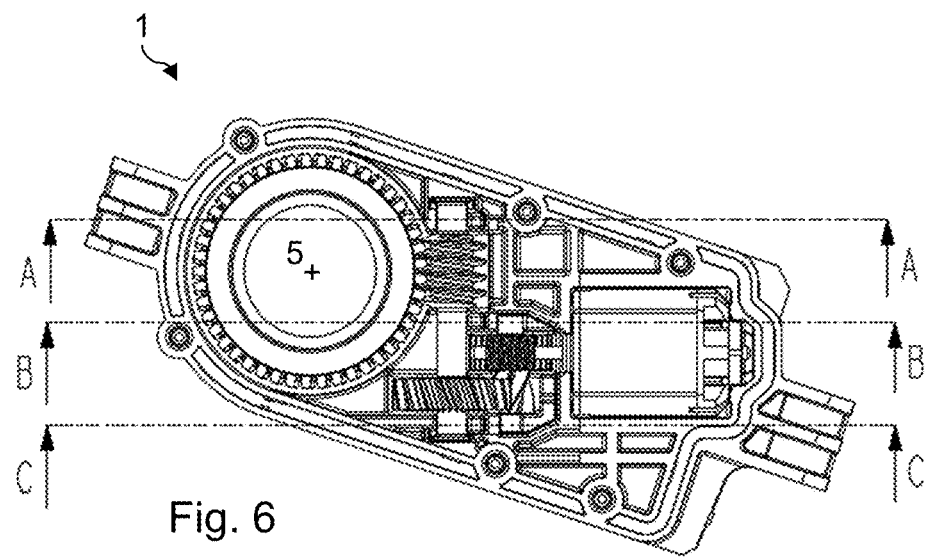
FIG. 6 shows a partly opened top view of the adjustment mechanism of FIGS. 2 to 5.

The stiffeners S here include two plates 15 (see e.g. FIGS. 1, 2, 5) provided in the housing 4 that limit movement of the main worm 9, in particular its axle 24, in opposite directions along its main axis 12.

Figure 3:
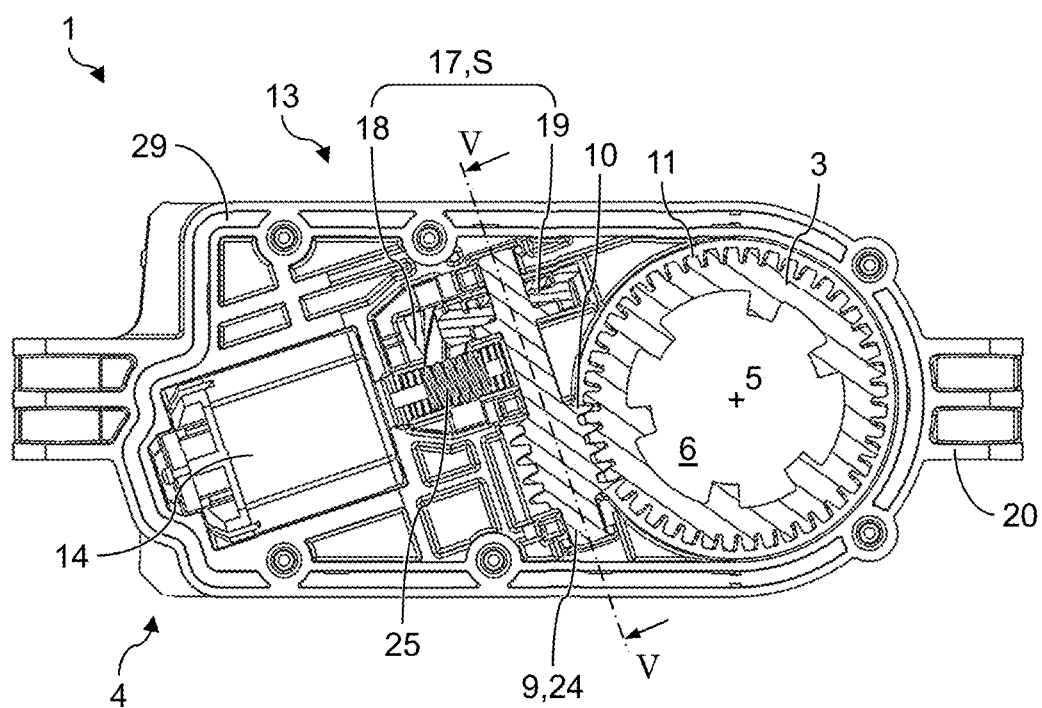
FIG. 3 shows a cross sectional top view of the adjustment mechanism of FIG. 2.

The stiffeners S here also include an intermediate gear set element 17 (see e.g. FIGS. 1, 3) held in the housing 4 and included in the drive train 13 between the electric motor 14 that powers the drive train 13 and the main worm gear wheel 3. The intermediate gear set element 17 includes a first gear 18 on the motor side intermeshing with a second gear 19 on the main worm side. The driving efficiency between the gears 18,19 is less than 50% when the second gear 19 drives the first gear 18 so as to limit rotational movement of the main worm 9 under torque that is applied between main worm gear wheel 3 and housing 4 external to the drive train 13.

Figure 7A:
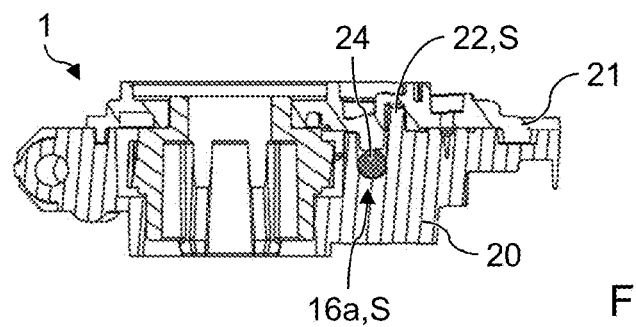
FIGS. 7A, 7B and 7C show cross sectional views of the adjustment mechanism of FIGS. 2 to 6 along the lines A, B and C in FIG. 6, respectively.
Figure 7B:
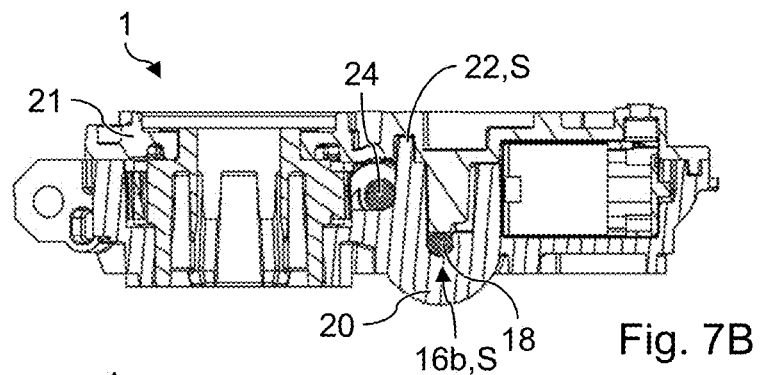
Figure 7C:
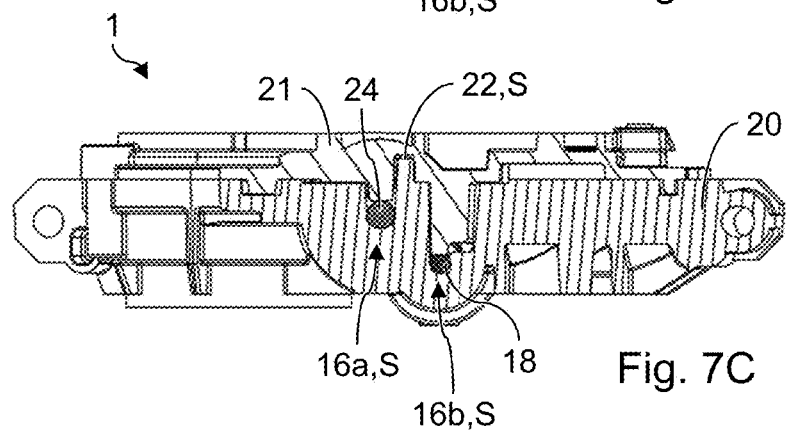

The stiffeners S here also include slots 16a, 16b (see e.g. FIGS. 7A-C) provided in the housing 4. Here, two slots 16a limit movement of the main worm 9 in a direction transverse to its main axis 12, here in particular one at either axial end of the main worm 9. It shall be appreciated that in FIGS. 7A-C, this main axis 12 extends normal to the plane of the drawing, at the axle 24. A further slot 16b here similarly limits movement of an axle of the first gear 18 of the intermediate gear set element 17 of the drive train 13.

In the shown examples, the housing 4 includes a base 20 and a cover 21.

Optionally, the main worm gear wheel 3, the main worm 9 and preferably the electric motor 14 and further gear components of the adjustment mechanism 1 have been mounted to the base 20 by insertion in an insertion direction ID that is transverse to a bottom plane of the base 20.

The stiffeners S here also comprise three struts 22 (see e.g. FIGS. 1, 2, 7A-C) to limit radial outward movement of the main axis 12 of the main worm 9 relative to the main axis 5 of the main worm gear 3. The shown struts 22 extends from the base 20, and that are held in the cover 21.

In the shown examples, stiffeners S are provided between the housing 4 and the main worm gear wheel 3 to limit axial and transverse movement of the main worm gear wheel 3 relative to its main axis 5 under torque that is applied between main worm gear wheel 3 and housing 4 external to the drive 13.

The stiffeners S here include a radial and/or axial bearing surface 23 (see FIG. 1) for the main worm gear wheel 3.

Figure 10:
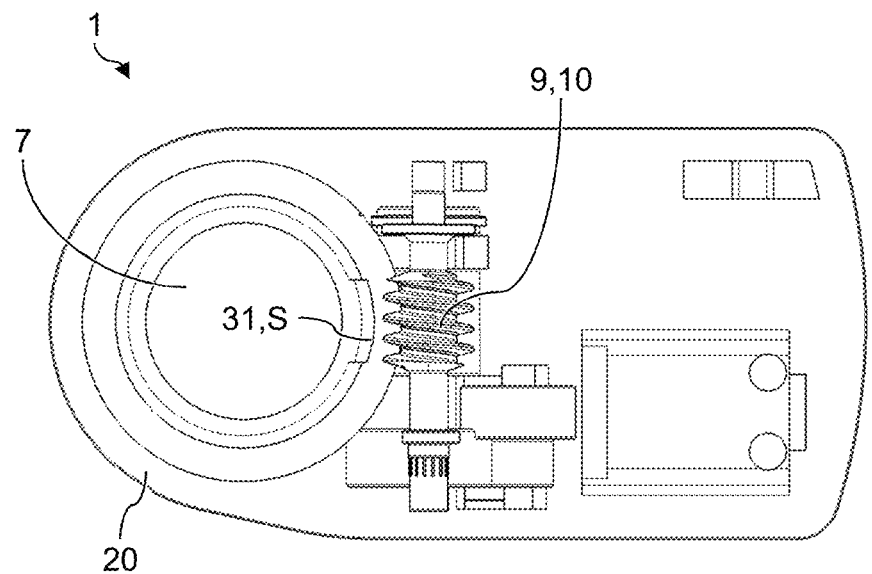
FIG. 10 shows a partly opened top view of a further example of an adjustment mechanism.
Figure 11:
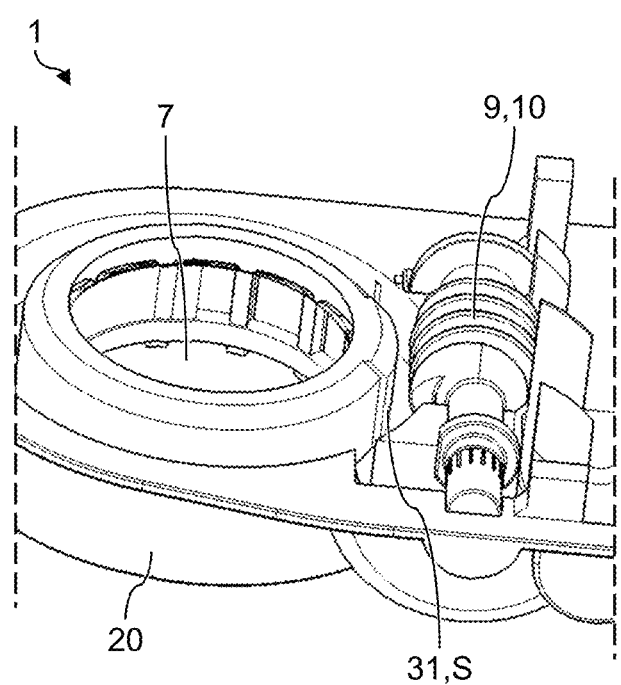
FIG. 11 shows a partly opened perspective view of the adjustment mechanism of FIG. 10.

With reference to FIGS. 10 and 11, the stiffeners S may additionally or alternatively include a local radial bearing support 31 at an inner portion of a mantle surface of the main worm gear wheel 3 at a location on the circumference of the main worm gear wheel 3 where its teeth 11 are in intermeshing arrangement with the circumferential spiral tooth 10 of the main worm 9, so as to limit local radial inward movement of the mantle surface. In FIGS. 10 and 11 it can be seen that the local radial bearing support 31 is configured to locally limit radial play for the main worm gear wheel 3 (not shown in FIGS. 10 and 11), so that play between the main worm gear wheel 3 and the main worm 9 transverse to the main axis 12 of the main worm 9 is reduced, in particular locally while radial play of the main worm gear wheel 3 is less constrained elsewhere along the circumference of the main worm gear wheel 3.

The stiffeners S may include a bonded connection 26 between the base 20 and the cover 21. The bonded connection 26 may be formed as a weld, for example an ultrasonic weld and/or a laser weld.

Figure 4:
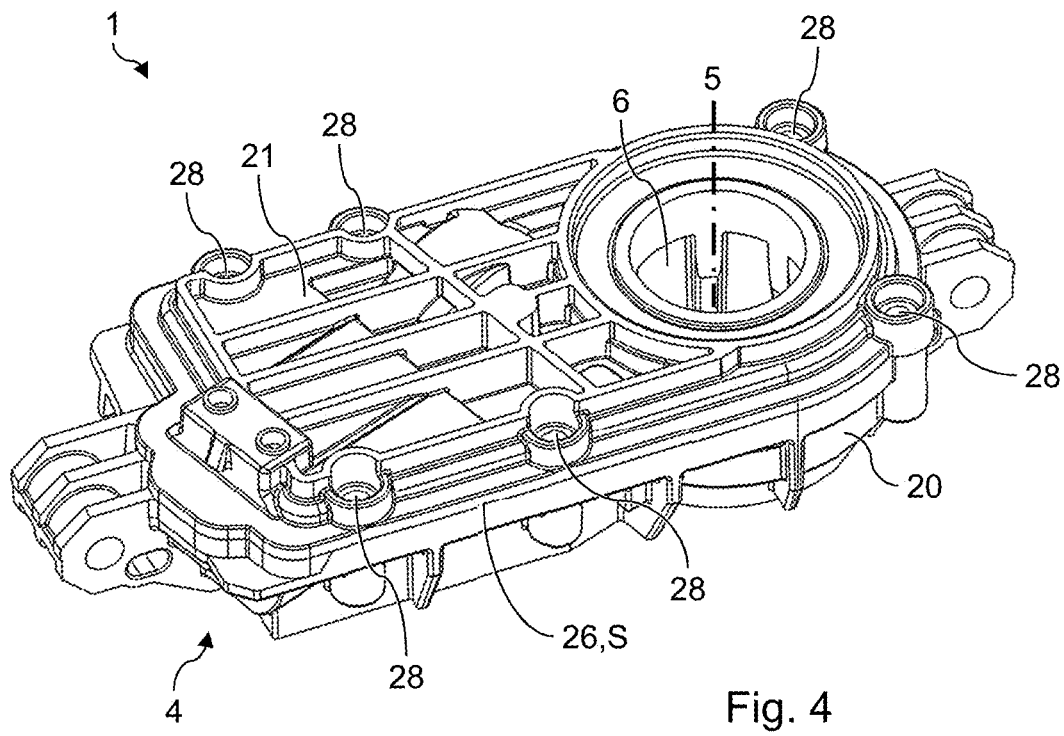
FIG. 4 shows a perspective view of the adjustment mechanism of FIGS. 2 and 3.

The base 20 and the cover 21 may additionally or alternatively be connected via one or more fasteners such as screws, which may then form one or more additional or alternative stiffeners. The base 20 and/or the cover 21 may thereto be provided with screw holes 28, as indicated in FIG. 4. It is noted that such screw holes have been omitted in the examples of FIG. 1 and FIG. 8, whereas otherwise these examples essentially correspond to the example shown in FIGS. 2 to 7.

The stiffeners S preferably limit relative rotation of the housing 4 relative to the main worm gear wheel 3 under a moment of 5 Nm applied between the housing 4 and the main worm gear wheel 3 when the drive train 13 is not in operation to less than 3°. The stiffeners may provide a rotational stiffness between the housing and the main gear wheel of at least 1.6 Nm/°.

Many variations will be apparent to the skilled person in the art. For example, an adjustment device may comprise a plurality of adjustment mechanisms, for example associated with a same or a different shaft. An electric motor of an adjustment mechanism may be powered using mains power, solar power, battery power, etc., and may be controlled by an electronic controller, e.g. via a wired or wireless connection. Further examples have been provided throughout the description.

Such variations are understood to be comprised within the scope of the invention defined in the appended claims.

LIST OF REFERENCE SIGNS

1. Adjustment mechanism
2. Adjustment device
3. Main worm gear wheel
4. Injection molded plastic housing
5. Main axis of worm gear wheel
6. Hollow central axial passage
7. Opening of housing
8. Shaft
9. Main worm
10. Circumferential spiral tooth
11. Teeth on circumference of main worm gear wheel
12. Main axis of main worm
13. Drive train
14. Electric motor
15. Plate
16a. Slot
16b. Further slot
17. Intermediate gear set element
18. First gear
19. Second gear
20. Base
21. Cover
22. Strut
23. Radial and/or axial bearing surface
24. Axle of main worm
25. Motor worm
26. Bonded connection
27. Hollow bevel gear
28. Screw hole
29. Circumferential rim portion of base
30. Circumferential rim portion of cover
31. Local radial bearing support
32. Wedging structure
ID. Insertion direction
S. Stiffener

The invention claimed is:

1. An adjustment mechanism for an adjustment device, the adjustment mechanism comprising:
   a main worm gear wheel held in an injection molded plastic housing for rotation relative to each other about a main axis of the main worm gear wheel, the main worm gear wheel being provided with a hollow central axial passage and the housing being provided with at least one opening that is axially aligned with the central axial passage to allow a shaft to extend via the opening through the housing into the central axial passage and to be in supporting engagement with the main worm gear wheel; and
   a main worm having at least one circumferential spiral tooth in intermeshing arrangement with teeth on the circumference of the main worm gear wheel, the main worm being held in the housing for rotation about a main axis of the main worm, and being arranged to be driven to rotation relative to the housing about the main axis of the main worm via a drive train powered by an electric motor held in the housing,
   wherein a number of stiffeners is provided between the housing and at least one of the main worm gear wheel and the main worm to lock the intermeshing arrangement of the teeth under torque that is applied between the main worm gear wheel and the housing external to the drive train, and
   wherein the stiffeners limit rotation of the housing relative to the main gear wheel under a moment of 5 Nm applied between the housing and the main gear wheel when the drive is not in operation to less than 3°.

2. The adjustment mechanism according to claim 1, wherein at least some of the number of stiffeners are provided between the housing and the main worm to limit at least one of axial movement, transverse movement, or rotational movement of the main worm under torque that is applied between the main worm gear wheel and the housing external to the drive train.

3. The adjustment mechanism according to claim 2, wherein at least some of the stiffeners are provided between the housing and the main worm to limit axial, transverse, and rotational movement of the main worm under torque that is applied between the main worm gear wheel and the housing external to the drive train.

4. The adjustment mechanism according to claim 2, wherein the stiffeners include one or more plates provided in the housing, the one or more plates limiting movement of the main worm in opposite directions along the main axis.

5. The adjustment mechanism according to claim 2, wherein the stiffeners include at least one slot provided in the housing, the slot limiting movement of at least one of the main worm and any element of the drive train in a direction transverse to the main axis of the main worm.

6. The adjustment mechanism according to claim 2, wherein the stiffeners include an intermediate gear set element held in the housing and included in the drive train between the electric motor that powers the drive train and the main worm gear wheel, the intermediate gear set element including a first gear on a side of the electric motor intermeshing with a second gear on a side of the main worm, the driving efficiency between the gears being less than 50% when the second gear drives the first gear so as to limit rotational movement of the main worm under torque that is applied between the main worm gear wheel and the housing external to the drive train.

7. The adjustment mechanism according to claim 1, wherein the housing includes a base and a cover.

8. The adjustment mechanism according to claim 7, wherein the main worm gear wheel and the main worm have been mounted to the base by insertion in an insertion direction that is transverse to a bottom plane of the base.

9. The adjustment mechanism according to claim 7, wherein the stiffeners comprise a strut that extends from one of the base and the cover, and that is held in the other of the base and the cover.

10. The adjustment mechanism according to claim 7, wherein the stiffeners include a bonded connection between the base and the cover.

11. The adjustment mechanism according to claim 10, wherein the bonded connection is formed as a weld.

12. The adjustment mechanism according to claim 1, wherein the stiffeners comprise a strut to limit radial outward movement of the main axis of the main worm relative to the main axis of the main worm gear wheel.

13. The adjustment mechanism according to claim 1, wherein one or more stiffeners of the number of stiffeners are provided between the housing and the main worm gear wheel to limit axial and transverse movement of the main worm gear wheel relative to the main axis under torque that is applied between the main worm gear wheel and the housing external to the drive train.

14. The adjustment mechanism according to claim 13, wherein the stiffeners include surface for the main worm gear wheel.

15. The adjustment mechanism according to claim 14, wherein the stiffeners include a local radial bearing support at an inner portion of a mantle surface of the main worm gear wheel at a location on the circumference of the main worm gear wheel where teeth of the main worm gear wheel are in intermeshing arrangement with the circumferential spiral tooth of the main worm, so as to limit local radial inward movement of the mantle surface.

16. An adjustment device, comprising an adjustment mechanism according to claim 1 and the shaft, wherein the main worm gear wheel is in supporting engagement with the shaft, wherein the shaft extends via the opening through the housing into the central axial passage so as to be rotatable relative to the housing.

17. An adjustment mechanism for an adjustment device, the adjustment mechanism comprising:
   a main worm gear wheel held in an injection molded plastic housing for rotation relative to each other about a main axis of the main worm gear wheel, the main worm gear wheel being provided with a hollow central axial passage and the housing being provided with at least one opening that is axially aligned with the central axial passage to allow a shaft to extend via the opening through the housing into the central axial passage and to be in supporting engagement with the main worm gear wheel; and
   a main worm having at least one circumferential spiral tooth in intermeshing arrangement with teeth on the circumference of the main worm gear wheel, the main worm being held in the housing for rotation about a main axis of the main worm, and being arranged to be driven to rotation relative to the housing about the main axis of the main worm via a drive train powered by an electric motor held in the housing,
   wherein a number of stiffeners is provided between the housing and at least one of the main worm gear wheel and the main worm to lock the intermeshing arrangement of the teeth under torque that is applied between the main worm gear wheel and the housing external to the drive train, and
   wherein the at least some of the stiffeners include an intermediate gear set element held in the housing and included in the drivetrain between the electric motor that powers the drive train and the main worm gear wheel, the intermediate gear set element including a first gear on a side of the motor intermeshing with a second gear on a side of the main worm, the driving efficiency between the gears being less than 50% when the second gear drives the first gear so as to limit rotational movement of the main worm under torque that is applied between the main worm gear wheel and the housing external to the drive train.

18. An adjustment device, comprising an adjustment mechanism according to claim 17 and the shaft, wherein the main worm gear wheel is in supporting engagement with the shaft, wherein the shaft extends via the opening through the housing into the central axial passage so as to be rotatable relative to the housing.

19. An adjustment mechanism for an adjustment device, the adjustment mechanism comprising:
   a main worm gear wheel held in an injection molded plastic housing for rotation relative to each other about a main axis of the main worm gear wheel, the main worm gear wheel being provided with a hollow central axial passage and the housing being provided with at least one opening that is axially aligned with the central axial passage to allow a shaft to extend via the opening through the housing into the central axial passage and to be in supporting engagement with the main worm gear wheel; and
   a main worm having at least one circumferential spiral tooth in intermeshing arrangement with teeth on the circumference of the main worm gear wheel, the main worm being held in the housing for rotation about a main axis of the main worm, and being arranged to be driven to rotation relative to the housing about the main axis of the main worm via a drive train powered by an electric motor held in the housing,
   wherein a number of stiffeners is provided between the housing and at least one of the main worm gear wheel and the main worm to lock the intermeshing arrangement of the teeth under torque that is applied between the main worm gear wheel and the housing external to the drive train, and
   wherein the stiffeners comprise a strut that extends from one of a base of the housing or a cover of the housing, and that is held in the other of the base or the cover.

20. An adjustment device, comprising an adjustment mechanism according to claim 19 and the shaft, wherein the main worm gear wheel is in supporting engagement with the shaft, wherein the shaft extends via the opening through the housing into the central axial passage so as to be rotatable relative to the housing.

* * * * *